(12) United States Patent
Pettay et al.

(10) Patent No.: US 9,036,809 B1
(45) Date of Patent: *May 19, 2015

(54) GLOBAL INTERPRETER/TRANSLATION SERVICES VIA CONFERENCE BRIDGE

(71) Applicant: West Corporation, Omaha, NE (US)

(72) Inventors: Mark J. Pettay, Omaha, NE (US); Myron P. Sojka, Logan, IA (US); Mark Steven Jarzynka, Omaha, NE (US); Gregory Stuart Cardin, Omaha, NE (US); Hendryanto Rilantono, Omaha, NE (US); Bernard Roubaud, Castelnau le lez (FR)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,550

(22) Filed: Aug. 8, 2013

Related U.S. Application Data (63) Continuation of application No. 13/157,660, filed on Jun. 10, 2011, now Pat. No. 8,520,833.

(51) Int. Cl.
  *H04M 3/00* (2006.01)
  *H04M 5/00* (2006.01)
  *H04M 3/42* (2006.01)
  *H04M 3/56* (2006.01)

(52) U.S. Cl.
  CPC ........ *H04M 3/56* (2013.01); *H04M 2203/2061* (2013.01); *H04M 2242/12* (2013.01)

(58) Field of Classification Search
  CPC ....... H04M 3/51; H04M 3/56; H04M 3/5166; H04M 3/5175; H04M 3/5183; H04M 3/523; H04M 3/5232; H04M 3/5233; H04M 3/5237; H04M 3/5238; H04M 2203/2061; H04M 2242/12; G06Q 10/06
  USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
  See application file for complete search history.

(56) References Cited

U.S. PATENT DOCUMENTS

| | | | |
|---|---|---|---|
| 4,750,201 A * | 6/1988 | Hodgson et al. | 379/144.04 |
| 6,690,932 B1 * | 2/2004 | Barnier et al. | 455/414.1 |
| 7,180,993 B2 * | 2/2007 | Hamilton | 379/207.02 |
| 7,769,160 B1 * | 8/2010 | Cordell et al. | 379/265.05 |
| 8,244,222 B2 | 8/2012 | Sanders et al. | |
| 8,442,856 B2 * | 5/2013 | Hanahara et al. | 705/7.35 |
| 8,687,791 B1 * | 4/2014 | Cordell et al. | 379/265.04 |
| 8,761,379 B2 * | 6/2014 | Davis et al. | 379/265.11 |

(Continued)

*Primary Examiner* — Khai N Nguyen (57) ABSTRACT

Embodiments of the present invention pertain to an apparatus, method, and a computer program configured to connect a translator located in a remote area to a conference holding area, and also connect a customer and customer service representative to the translator in order for the translator to translate between the customer service representative and the customer, when the customer services representative determines that a translator is needed.

15 Claims, 6 Drawing Sheets

(56) References Cited

U.S. PATENT DOCUMENTS

| | | |
|---|---|---|
| 2006/0259307 A1 | 11/2006 | Sanders et al. |
| 2007/0041548 A1* | 2/2007 | Ordille et al. ............ 379/202.01 |
| 2007/0064915 A1 | 3/2007 | Moore et al. |
| 2007/0160188 A1* | 7/2007 | Sharpe et al. ............ 379/265.01 |
| 2007/0206765 A1* | 9/2007 | Shaffer et al. ............ 379/265.01 |
| 2008/0091473 A1* | 4/2008 | Choppin ............................ 705/3 |
| 2010/0058460 A1* | 3/2010 | Kaiser et al. ...................... 726/16 |
| 2010/0150331 A1* | 6/2010 | Gitelis et al. ............ 379/202.01 |
| 2010/0316213 A1* | 12/2010 | Goel et al. ............... 379/265.09 |
| 2011/0158397 A1* | 6/2011 | Simoes et al. ........... 379/265.02 |
| 2011/0218939 A1* | 9/2011 | Hanahara et al. ............. 705/400 |
| 2011/0224970 A1* | 9/2011 | Bernal .............................. 704/8 |
| 2011/0287748 A1 | 11/2011 | Angel et al. |

\* cited by examiner

GLOBAL INTERPRETER/TRANSLATION SERVICES VIA CONFERENCE BRIDGE

CROSS-REFERENCE TO RELATED APPLICATIONS

This application is a continuation from U.S. patent application Ser. No. 13/157,660, filed Jun. 10, 2011, now U.S. Pat. No. 8,520,833, and entitled "GLOBAL INTERPRETER/TRANSLATION SERVICES VIA CONFERENCE BRIDGE", which is incorporated by reference herein in its entirety.

FIELD

The present invention relates to translation services and, more particularly, to translation services for audio conferencing.

BACKGROUND

Generally, when a customer speaking a foreign language calls a call center, the customer presumes the agent answering at the call center speaks the same language as the customer. However, there may be times when the customer calling and the call center agent speak two different languages. In those situations, a translator is needed to interpret between the call center agent and the customer.

SUMMARY

Certain embodiments of the present invention may provide solutions to the problems and needs in the art that have not yet been fully identified, appreciated, or solved by current translation service systems.

In accordance with an embodiment of the present invention, a computer-implemented method is provided that includes connecting, by a conference bridge, a translator located in a remote area to a conference holding area. The method also includes connecting a customer and customer service representative to the translator in order for the translator to translate between the customer service representative and the customer.

In accordance with another embodiment of the present invention, a computer program embodied on a non-transitory computer-readable medium is provided. The computer program is configured to cause the processor to connect a translator located in a remote area to a conference holding area, and connect a customer and customer service representative to the translator in order for the translator to translate between the customer service representative and the customer.

In yet another embodiment of the present invention, an apparatus is provided that includes a processor and memory including instructions. The processor is configured to connect a translator located in a remote area to a conference holding area, and connect a customer and customer service representative to the translator in order for the translator to translate between the customer service representative and the customer.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein relate to an integration with a global bridging platform from an agent or other platform that allows a bridge for bridging of multiple people into a conference call with a translator that is situated somewhere globally. In other words, embodiments of the present invention provide for a platform that bridges a plurality of people into a conference call with a translator.

Figure 1:
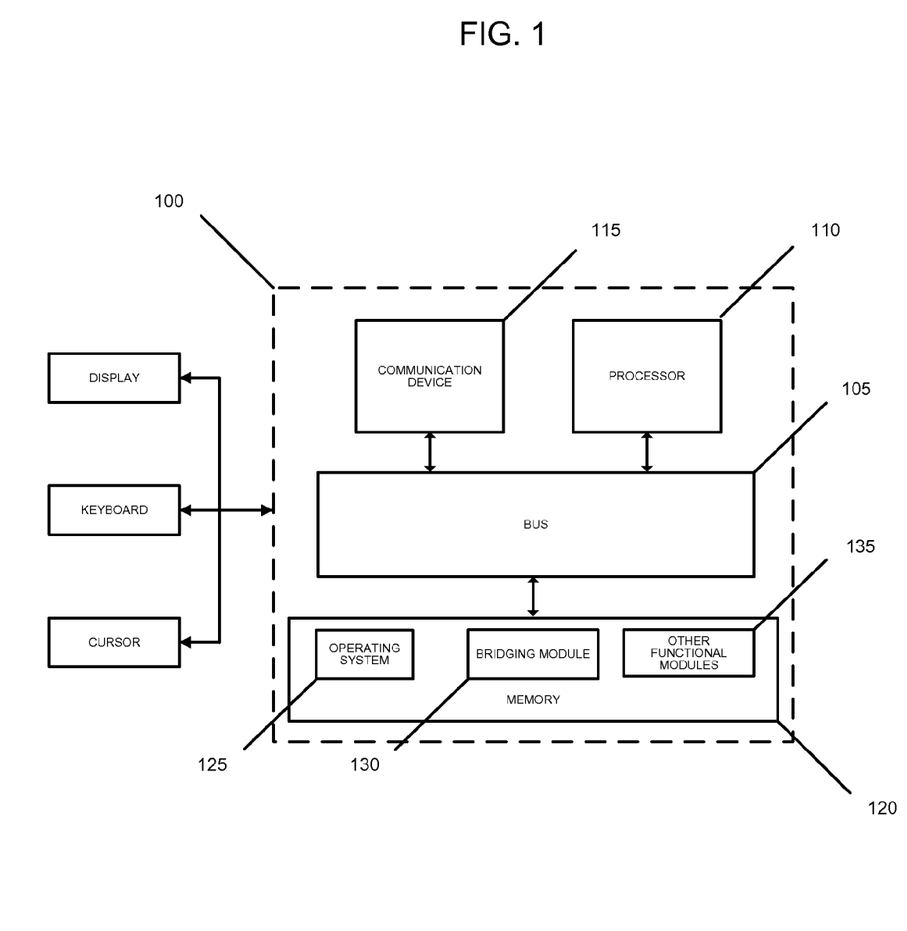
FIG. 1 illustrates a block diagram of a system that can be implemented in one or more embodiments of the present invention.

FIG. 1 illustrates a block diagram of a system 100 that can be implemented in one or more embodiments of the present invention. System 100 may include a bus 105 or other communication mechanism that can communicate information and a processor 110, coupled to bus 105, that can process information. Processor 110 can be any type of general or specific purpose processor. System 100 may also include a memory 120 that can store information and instructions to be executed by processor 110. Memory 120 can be comprised of any combination of random access memory ("RAM"), read only memory ("ROM"), static storage such as a magnetic or optical disk, or any other type of non-transitory computer readable medium. System 100 may also include a communication device 115, such as a network interface card, that may provide access to a network.

The computer readable medium may be any available media that can be accessed by processor 110. The computer readable medium may include both volatile and nonvolatile media, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a bridging module 130, as well as other functional modules 135. Operating system 125 may provide operating system functionality for system 100. Because system 100 may be part of a larger system, system 100 may include one or more additional functional modules 135 to include the additional functionality, such as an IICP translator application.

Figure 2:
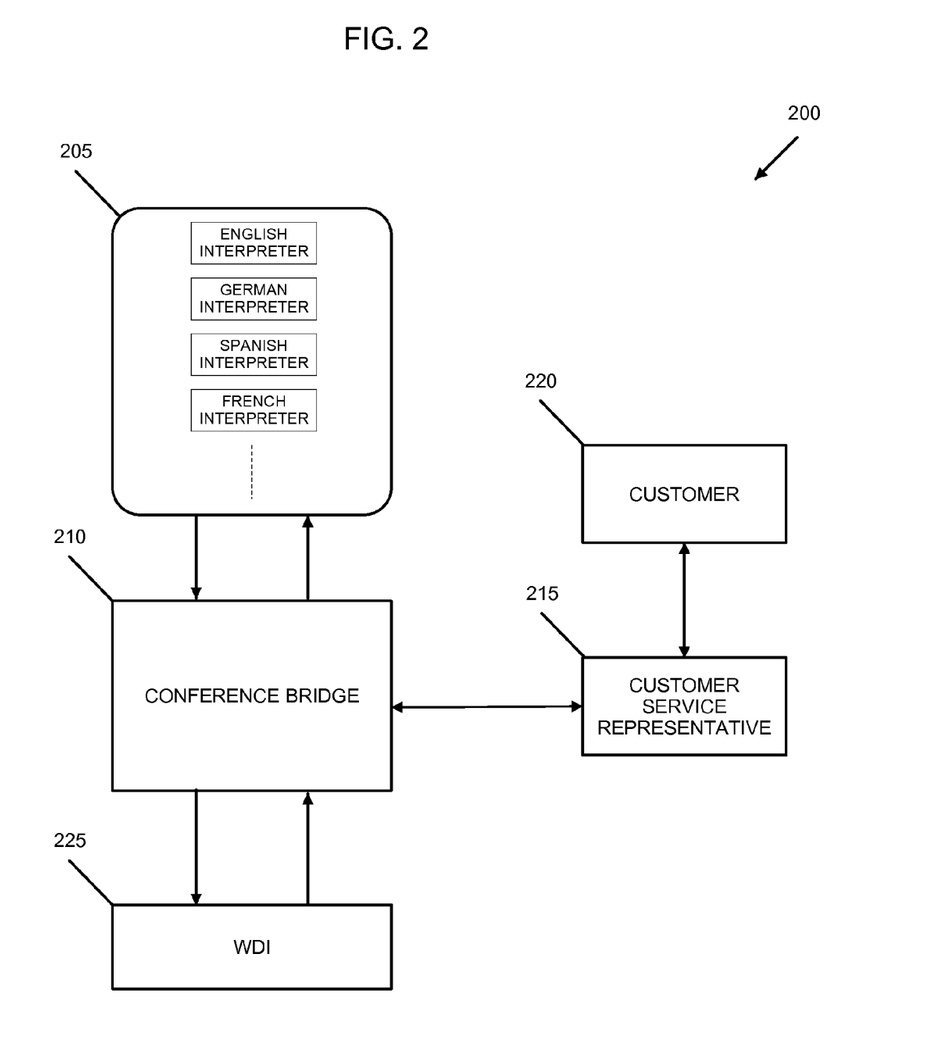
FIG. 2 illustrates a conference bridging system, in accordance with an embodiment of the present invention.

FIG. 2 illustrates a conference bridging system 200, in accordance with an embodiment of the present invention. System 200 includes a holding area 205 having one or more interpreters, a conference bridge 210, a customer service representative (CSR) 215, a user or customer 220, and a provider of interpretation services (WDI 225). Interpreters can provide language support, i.e., translate between an English speaking customer and a German-speaking agent. Conference Bridge (or V2 Conference Bridge) 210 is configured to connect the interpreter to conference holding area 205 after the interpreter has been authenticated. WDI 225 is configured to provide interpreter state data which is related to a current status such as "on a call", available, unavailable, and other statuses. In this embodiment, the interpreter dials into Conference Bridge 210, authenticates, indicates their language of expertise, and enters into a "music on hold" (MOH) state, which is conference holding area 205. The interpreter remains in such a state until CSR 215 selects the interpreter and connects customer 220 to the interpreter.

For instance, when CSR 220 determines that an interpreter is beneficial or required, operator 220 connects to Conference Bridge 210, authenticates, specifies a language, and engages interpreter 205 with customer 215.

Figure 3:
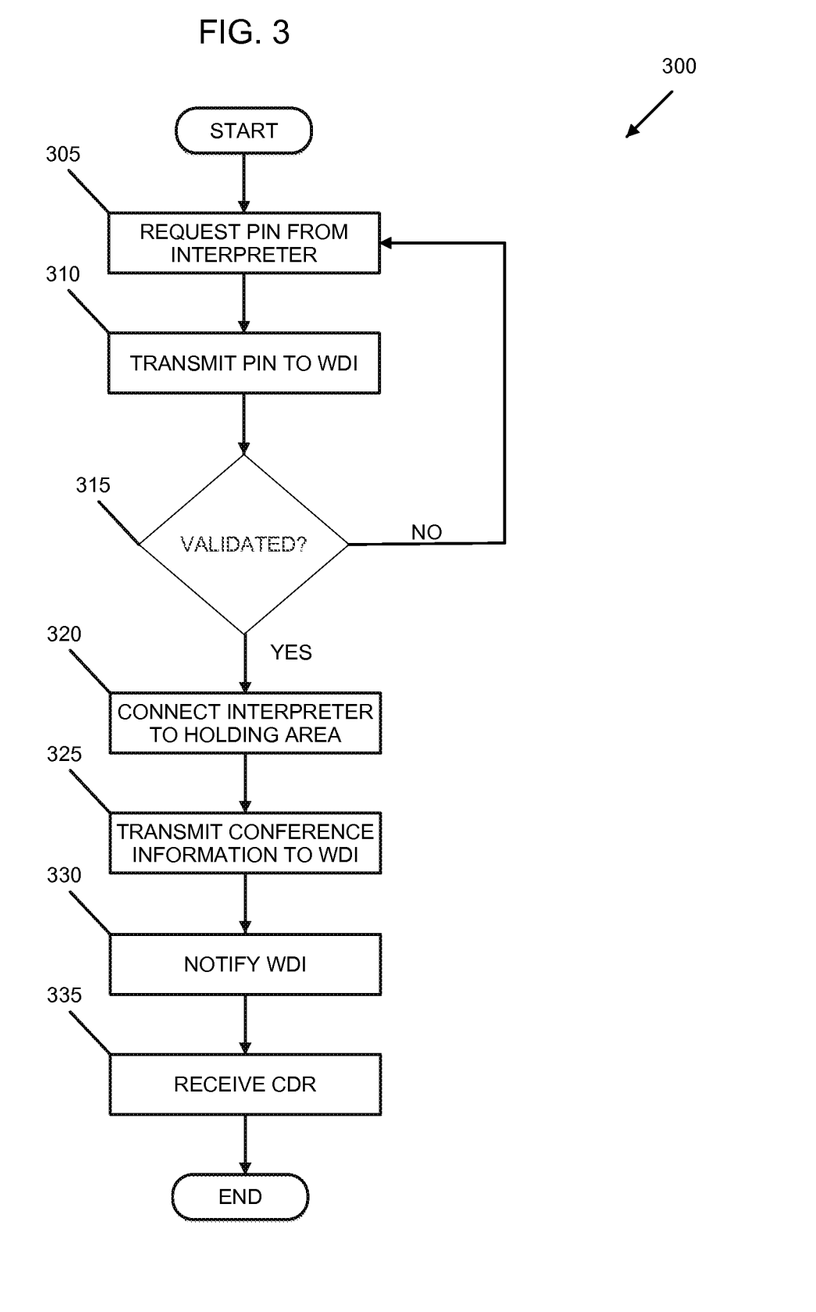
FIG. 3 illustrates a method for registering an interpreter, in accordance with an embodiment of the present invention.

FIG. 3 illustrates a method 300 for registering an interpreter, in accordance with an embodiment of the present invention. When an interpreter dials in (i.e., connects) to a conference bridge, the conference bridge at 305 requests that the interpreter submit a personal identification number (PIN). At 310, the bridge receives the PIN from the interpreter and transmits the PIN to WDI for validation. The PIN is utilized to authenticate and/or validate the interpreter, as well as identify the languages the interpreter is fluent in. Also, the PIN includes a number of digits that are used to validate the interpreter to the WDI.

At 315, the WDI determines if the PIN is valid or invalid. If the PIN is invalid, the bridge is notified and requests the interpreter to re-enter at 305 the PIN in order to validate the interpreter. If the PIN is valid, the bridge is notified and connects at 320 the interpreter to a conference holding area where the interpreter can, for example, listen to music while placed on hold. At 325, the bridge also transmits conference information regarding the interpreter to the WDI. For instance, the conference information can include, but is not limited to, a unit number, a line number, a setup time, a language identifier, a conference passcode, a conference identifier, a sub-conference identifier, and a state of the call. If necessary, the WDI can respond to the bridge with the unit number, the line number, the setup time, and a result.

In this embodiment, the unit number and the line number may be a four digit random number. The setup time can be a ten-digit time stamp, and the language indicator can be a three-digit language code. The conference passcode can be a sixteen-digit passcode, and the conference and the sub-conference identifiers can be a 60-byte identifier. The state of the call can indicate whether the parties are in a conference or whether the parties left the conference.

When the interpreter is disconnected or hangs up, the bridge transmits at 330 a message to the WDI notifying that the interpreter is no longer in the conference holding area or is no longer on a conference call. In response, the bridge receives a call data record (CDR) of the conference call.

Figure 4:
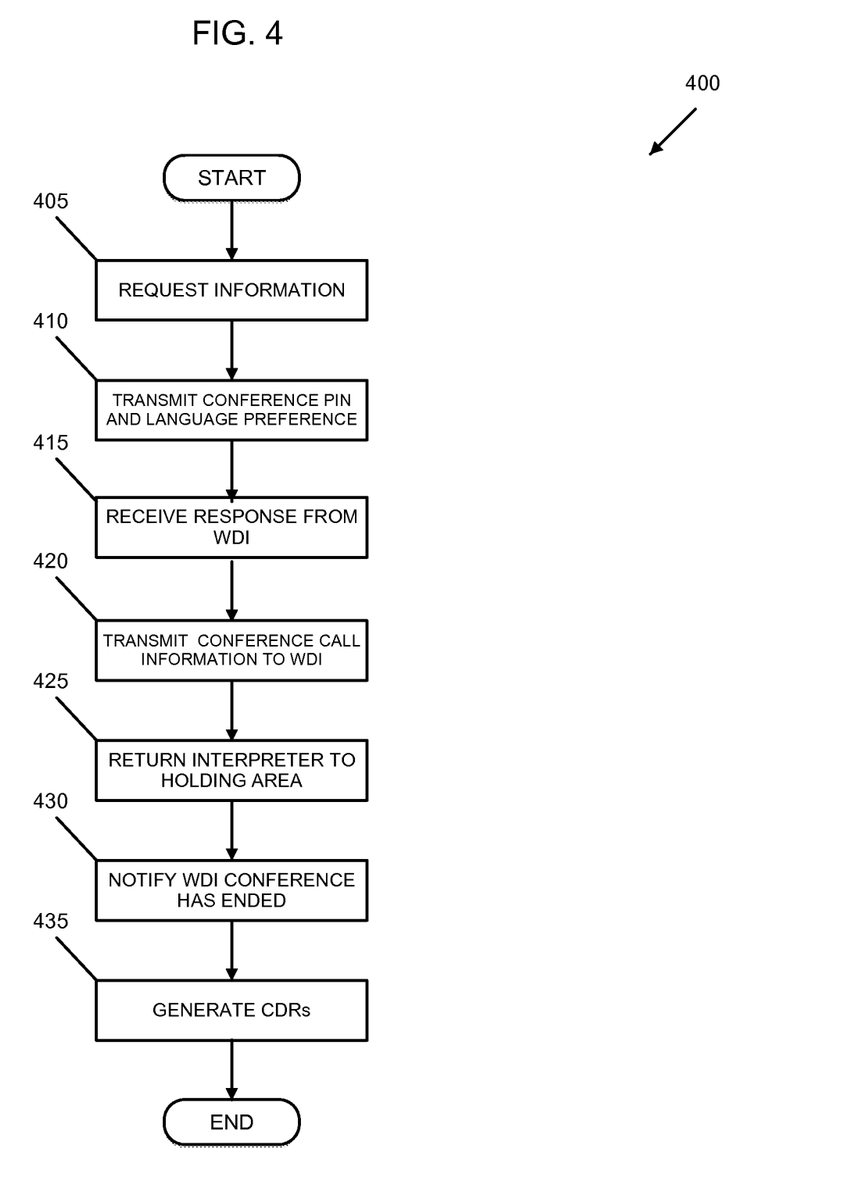
FIG. 4 illustrates a method for connecting an interpreter to a conference, in accordance with an embodiment of the present invention.

FIG. 4 illustrates a method 400 for connecting an interpreter to a conference, in accordance with an embodiment of the present invention. Generally, when a customer contacts a customer service representative (CSR) at a call center, the customer presumes that the CSR speaks the same language as the customer. However, this may not be the case in some instances. When either the CSR or the customer, or both, determine that an interpreter is required in order to translate between the CSR and the customer, the CSR can connect to a conference bridge utilizing a dedicated number. It should be appreciated that the CSR can also connect to the bridge utilizing a hyperlink or any other method that may be appreciated by a person of ordinary skill in the art.

When the CSR connects to the bridge, the bridge at 405 transmits a request for information either simultaneously or sequentially. The information being requested can be a conference personal identification number (PIN) to identify the CSR and a language preference. It should be appreciated that more than one language can be selected in the case where the customer and/or the CSR understand more than one language.

At 410, the bridge transmits the conference PIN and the language preference to the WDI. In particular, the conference PIN can be any number of digits that validates the CSR, and the language preference may be, but is not limited to, a three-digit code. At 415, the bridge receives call information, including the conference code and interpreter information, in order to connect to the appropriate interpreter. The call information can also include a unit name, a line name, a setup time, a language identifier, a conference passcode, a conference identifier, a sub-conference identifier, and a result indicating whether the request is valid or invalid.

At 420, when the CSR and customer are connected to the appropriate interpreter by the IICP, the bridge transmits to the WDI information regarding a conference start time. The information can include a conference passcode, a conference identifier, and a timestamp to indicate the start of the conference. When the conference has ended, the bridge at 425 returns the interpreter to the holding area so the interpreter can wait for the next conference when needed.

At 430, the bridge notifies the WDI that the conference has ended. The notification can include the PIN, the conference identifier, and a time stamp to indicate when the conference ended. At 435, when the conference ends, a CDR regarding the operator's call log and the interpreter's call log is generated, as well as the conference CDR.

Figure 5:
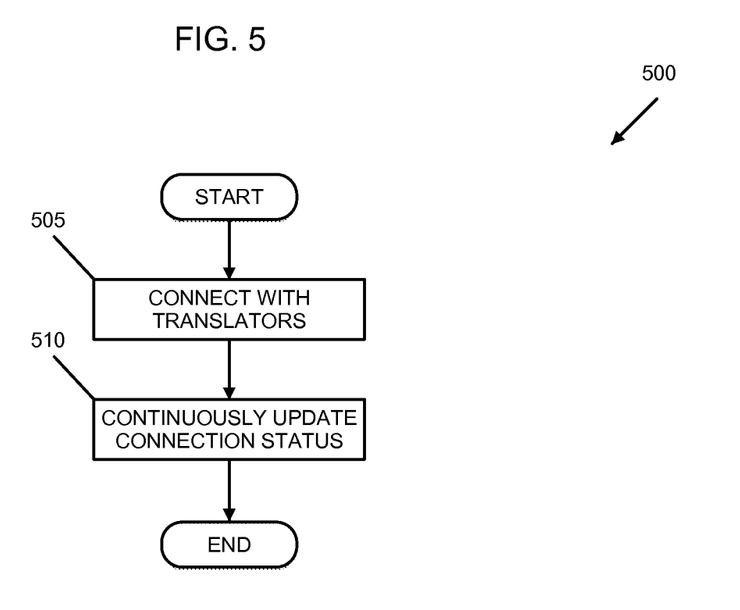
FIG. 5 illustrates a method for an IICP translator application updating the WDI of interpreter dial-ins, in accordance with an embodiment of the present invention.

FIG. 5 illustrates a method 500 for an IICP translator application updating the WDI of interpreter dial-ins, in accordance with an embodiment of the present invention. In this embodiment, the translator is presumed to be a Web service. At 505, one or more interpreters connect to the IICP translator application. As interpreters dial into an IICP translator application, the interpreters' information is relayed at 510 to the WDI application. The information may include a unit number (four-digit identifier), a line number (four-digit identifier), a setup timestamp, a language indicator (two-digit language code), a conference passcode (sixteen-digit passcode), a conference identifier (sixty-byte conference identifier), and a sub-conference identifier (sixty-byte sub-conference identifier).

Figure 6:
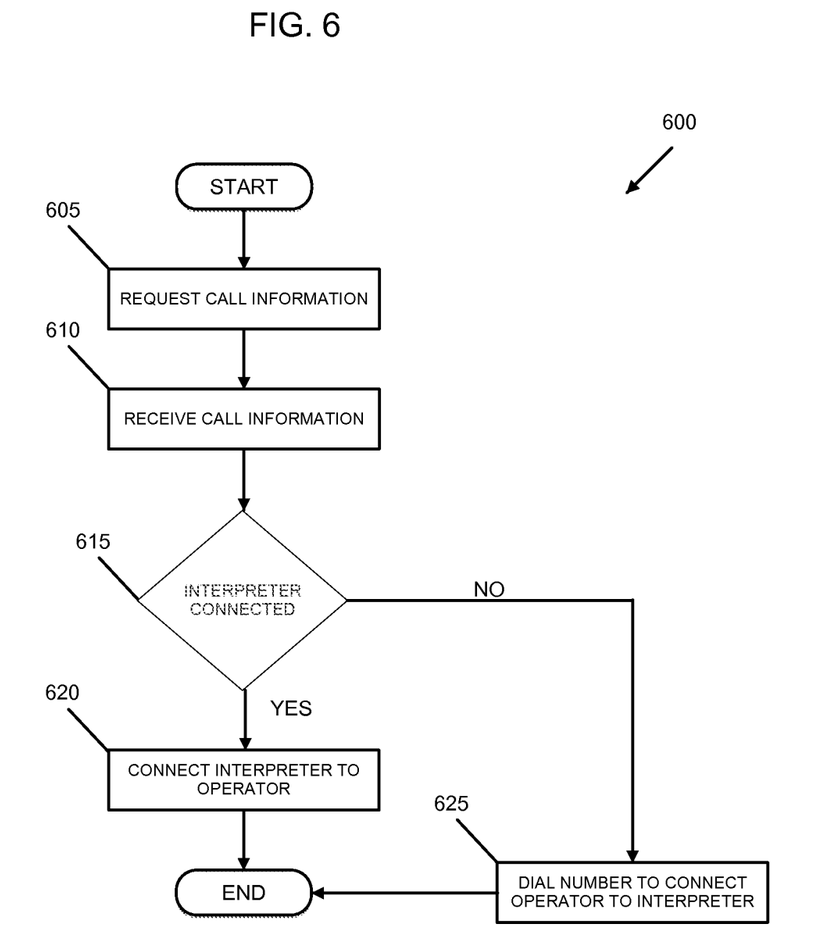
FIG. 6 illustrates a method for retrieving interpreter call information from WDI, in accordance with an embodiment of the present invention.

FIG. 6 illustrates a method 600 for retrieving interpreter call information from WDI, in accordance with an embodiment of the present invention. At 605, the IICP translator application requests call information from the WDI. At 610, the IICP translator application receives the call information having a unit number, a line number, a setup time, a language indicator, a conference passcode, a conference identifier, a sub-conference identifier, and a phone number. At 615, a determination is made as to whether the interpreter is dialed in or not. If the interpreter is not dialed into the conference, then at 620 the IICP translator application is configured to perform connect or bridge the interpreter to the operator (i.e., CSR) via the phone number. If the interpreter is dialed into the conference, then the IICP translator application connects at 625 the interpreter to the operator utilizing the call information received from the WDI.

The method steps shown in FIGS. 3-6 may be performed, in part, by a computer program product, encoding instructions for a nonlinear adaptive processor to cause at least the methods described in FIGS. 3-6 to be performed by the apparatuses discussed herein. The computer program product may be embodied on a non-transitory computer readable medium. The computer readable medium may be, but is not limited to, a hard disk drive, a flash device, a random access memory, a tape, or any other such medium used to store data. The computer program product may include encoded instructions for controlling the nonlinear adaptive processor to implement the method described in FIGS. 3-6, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    connecting, by a conference bridge, a translator to a conference holding area;
    receiving a personal identification number (PIN) of the translator;
    transmitting the translator PIN to a provider of interpretation services in order to validate the translator;
    receiving, from the provider of interpretation services, a validation message or an invalidation message;
    connecting a customer and a customer service representative to the translator in order for the translator to translate between the customer service representative and the customer, when the customer services representative determines that the translator is needed;
    receiving, from a customer service representative, a request for a translation service, a customer service representative PIN, and a language preference;
    transmitting the customer service representative PIN and the language preference to the provider of interpretation services in order to verify the customer service representative PIN; and
    receiving, from the provider of interpretation services, verification information regarding the customer service representative PIN;
    wherein when the invalidation message is received, transmitting a request to the translator to re-enter the translator PIN in order validate the translator; and
    wherein when the validation message is received, connecting the translator to the conference holding area and providing audio to the translator while on hold.

2. The computer-implemented method of claim 1, wherein the conference holding area includes a plurality of translators, each translator is capable of translating between one or more languages.

3. The computer-implemented method of claim 1, comprising
    transmitting a request for the translator PIN, when the translator connects to the conference bridge.

4. The computer-implemented method of claim 3, comprising
    receiving a result from the provider of interpretation services regarding the translator PIN, the result includes the validation message or invalidation message.

5. The computer-implemented method of claim 1, further comprising at least one of:
    when the translation services end between the customer service representative, the customer and the translator, returning the translator to the conference holding area; and
    notifying the provider of interpretation services that the conference has ended.

6. A computer program embodied on a non-transitory computer-readable medium, the computer program is configured to cause a processor to:
    connect a translator to a conference holding area;
    receive a personal identification number (PIN) of the translator;
    transmit the translator PIN to a provider of interpretation services in order to validate the translator;
    receive, from the provider of interpretation services a validation message or an invalidation message;
    connect a customer service representative to the translator in order for the translator to provide translation between the customer service representative and the customer, when the customer services representative determines that the translator is needed;
    receive, from a customer service representative, a request for a translation service, a customer service representative PIN and a language preference;
    transmit the customer service representative PIN and the language preference to the provider of interpretation services in order to verify the customer service representative PIN; and
    receive, from the provider of interpretation services, verification information regarding the customer service representative PIN;

wherein when the invalidation message is received, transmit a request to the translator to re-enter the translator PIN in order validate the translator; and wherein when the validation message is received, connect the translator to the conference holding area and providing audio to the translator while on hold.

7. The computer program of claim 6, wherein the conference holding area includes a plurality of translators, each translator is capable of translating between one or more languages.

8. The computer program of claim 6, wherein the computer program is further configured to cause the processor to transmit a request for the translator PIN, when the translator connects to a conference bridge.

9. The computer program of claim 8, wherein the computer program is further configured to cause the processor to receive a result from the provider of interpretation services regarding the translator PIN, the result includes the validation message or invalidation message.

10. The computer program of claim 6, wherein the computer program is further configured to cause the processor to perform at least one of:

when the translation services end between the customer service representative, the customer and the translator, return the translator to the conference holding area; and notify the provider of interpretation services that the conference has ended.

11. An apparatus, comprising:

a processor; and memory including instructions, wherein the processor is configured to:

connect a translator to a conference holding area; and receive the translator personal identification number (PIN);

transmit the translator PIN to a provider of interpretation services in order to validate the translator;

receive, from the provider of interpretation services a validation message or an invalidation message;

connect a customer service representative to the translator in order for the translator to provide translation between the customer service representative and the customer, when the customer services representative determines that the translator is needed;

receive, from a customer service representative, a request for a translation service, a customer service representative PIN and a language preference;

transmit the customer service representative PIN and the language preference to the provider of interpretation services in order to verify the customer service representative PIN; and receive, from the provider of interpretation services, verification information regarding the customer service representative PIN;

wherein when the invalidation message is received, transmit a request to the translator to re-enter the translator PIN in order validate the translator; and wherein when the validation message is received, connect the translator to the conference holding area and providing audio to the translator while on hold.

12. The apparatus of claim 11, wherein the conference holding area includes a plurality of translators, each translator is capable of translating between one or more languages.

13. The apparatus of claim 11, wherein the processor is further configured to transmit a request for the translator PIN, when the translator connects to a conference bridge.

14. The apparatus of claim 13, wherein the processor is further configured to receive a result from the provider of interpretation services regarding the translator PIN, the result includes the validation message or invalidation message.

15. The apparatus of claim 11, wherein the processor is further configured to perform at least one of:

when the translation services end between the customer service representative, the customer and the translator, return the translator to the conference holding area; and notify the provider of interpretation services that the conference has ended.

\* \* \* \* \*